United States Patent [19]
Wise et al.

[11] Patent Number: 5,853,827
[45] Date of Patent: Dec. 29, 1998

[54] ARRANGER, CROWN, AND PATTERN FOR ARRANGEMENTS OF DECORATIVE ITEMS

[75] Inventors: Joanne T. Wise, Chicago; Carolsue Peyton, Downers Grove, both of Ill.

[73] Assignee: N.E. Good Idea, Inc., Oakbrook Terrace, Ill.

[21] Appl. No.: 631,693

[22] Filed: Apr. 9, 1996

[51] Int. Cl.[6] ............................... A01G 5/04; A47G 7/00
[52] U.S. Cl. ............................ 428/23; 248/27.8; 434/93
[58] Field of Search ...................... 428/23, 24; 248/27.8; 434/93

[56] References Cited

U.S. PATENT DOCUMENTS

| | | | |
|---|---|---|---|
| D. 145,868 | 11/1946 | Fletcher | D11/147 |
| 1,775,250 | 9/1930 | Link | 47/41.13 |
| 1,947,702 | 2/1934 | Field | 47/41.13 |
| 3,745,702 | 7/1973 | Ogawa | 47/41.13 |
| 3,768,202 | 10/1973 | Wheelock | 47/41.13 |
| 4,386,480 | 6/1983 | Horowitz | 248/27.8 X |
| 4,600,612 | 7/1986 | Litwin et al. | 428/23 |
| 4,606,950 | 8/1986 | Corbet | 428/23 |
| 4,937,109 | 6/1990 | Lin | 428/23 |
| 5,259,141 | 11/1993 | D'Alessandro | 248/27.8 X |
| 5,630,291 | 5/1997 | Fontana | 248/27.8 X |

FOREIGN PATENT DOCUMENTS

| 257630 | 2/1965 | Australia | 428/23 |
|---|---|---|---|

Primary Examiner—Henry F. Epstein
Attorney, Agent, or Firm—Jack E. Dominik

[57] ABSTRACT

Disclosed is a crown which is essentially a single piece unit formed desirably of plastic having a domed center portion with a plurality of guides, and depending sides, each of which has coordinated guides. The sides, in turn, are hingedly secured to the domed central portion to permit a dependent relationship. Because each side has a securement means for penetrating a foam block, they can be wrapped around such a foam block in anticipation of the insertion of the decorative elements. Further in coordination with the crown, patterns are provided in which a sizing discipline is shown, and with exemplary head sizes, to the end that flowers, whether artificial or natural and items such as flags, balloons, hearts, signs, or other emblems, can be sized and then directly inserted into the crown in accordance with the keyed indicia on the sizing portion of the patterns. The method of the invention is directed to first determining a particular pattern which is desired, and thereafter sequencing the arrangement predicated upon a preselected pattern which, in turn, contains coded indicia. The coded indicia matches comparable coded indicia on the crown. As a result, once the ingredients of the bouquet are sized and segregated in accordance with the coded indicia on the pattern, they can thereafter be inserted into the guides in the crown with the assurance that an attractive physical display will result.

10 Claims, 5 Drawing Sheets

U.S. Patent     Dec. 29, 1998     Sheet 1 of 5     5,853,827
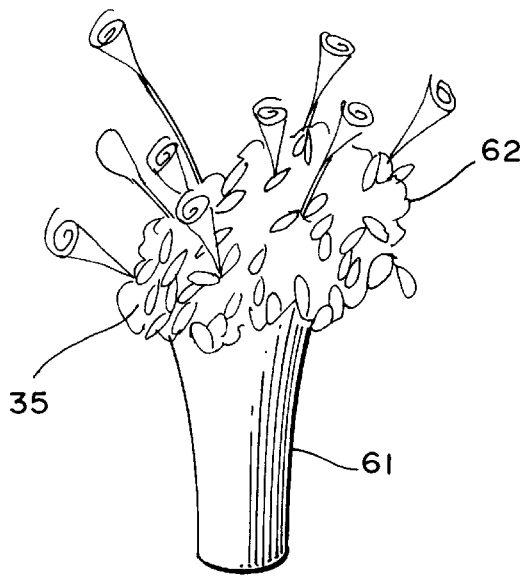
FIG.1
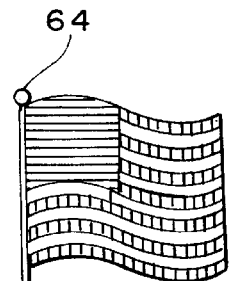
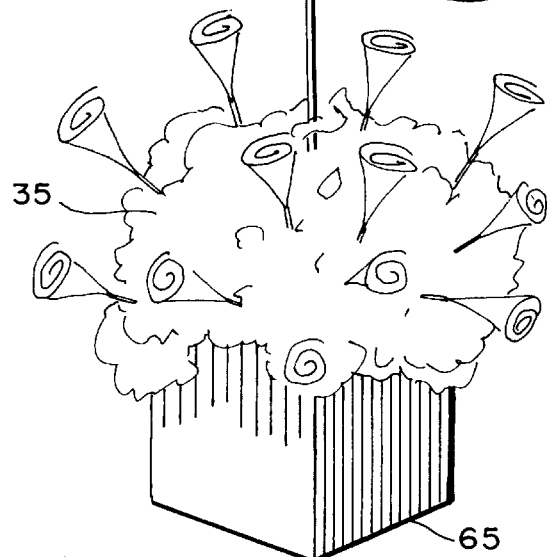
FIG.2
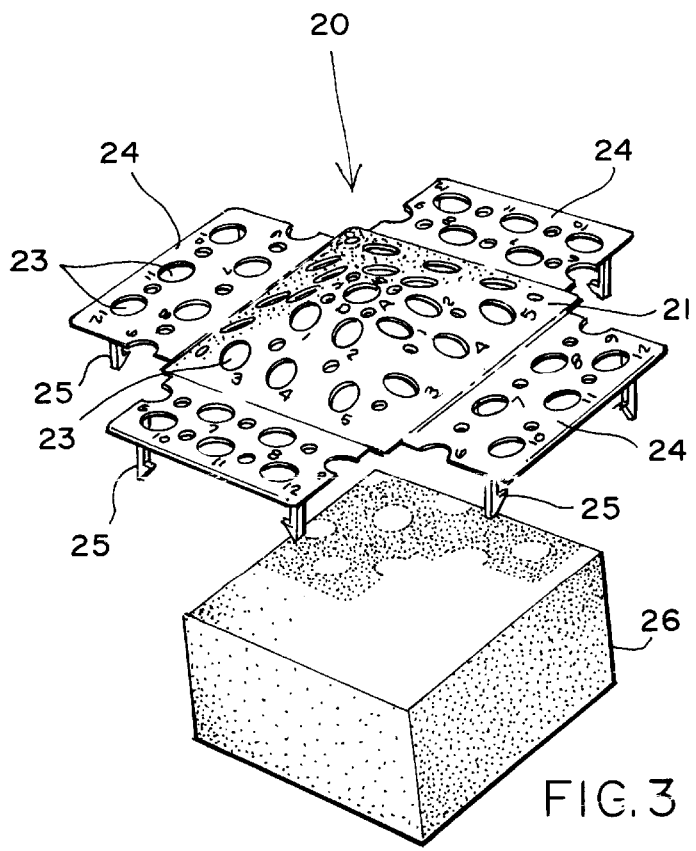
FIG.3

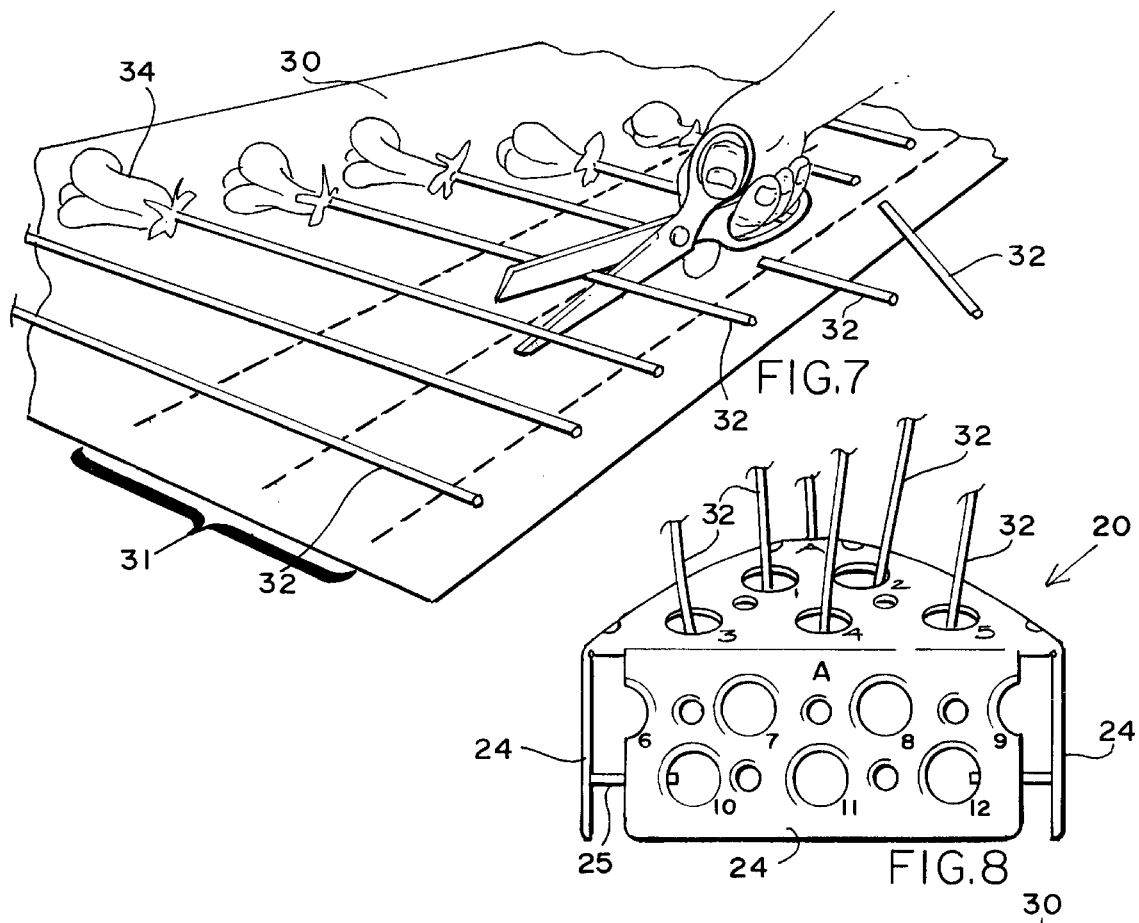
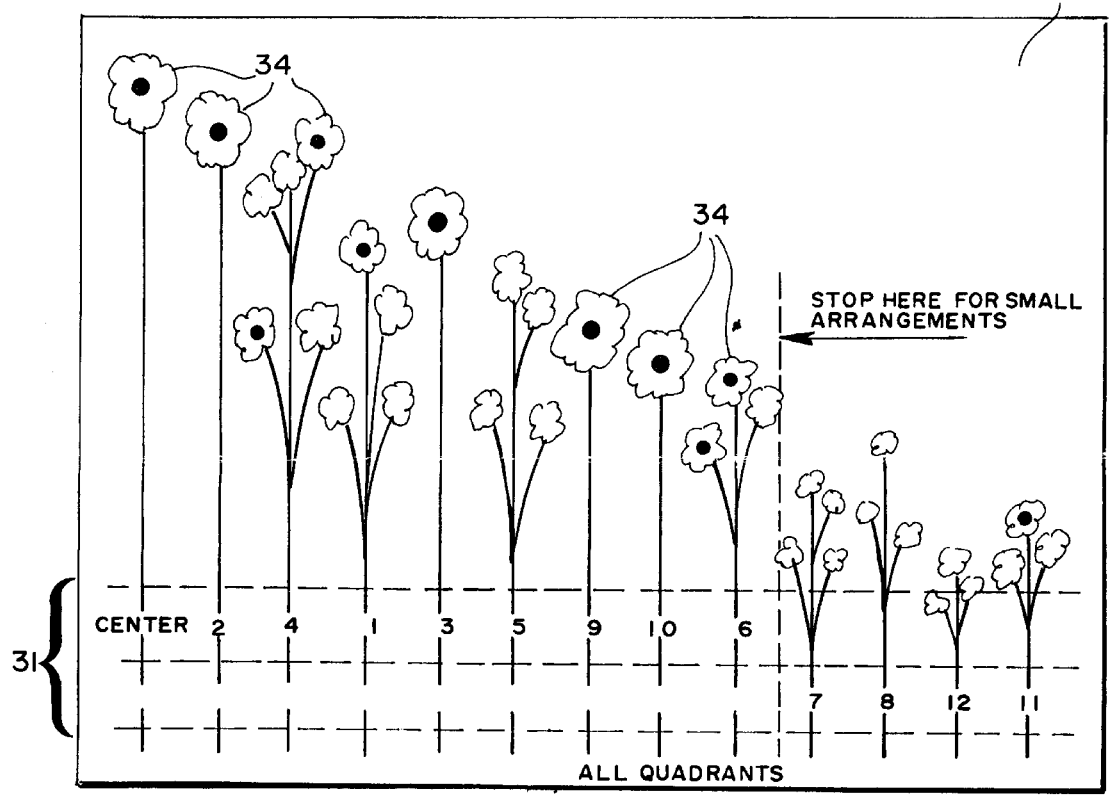

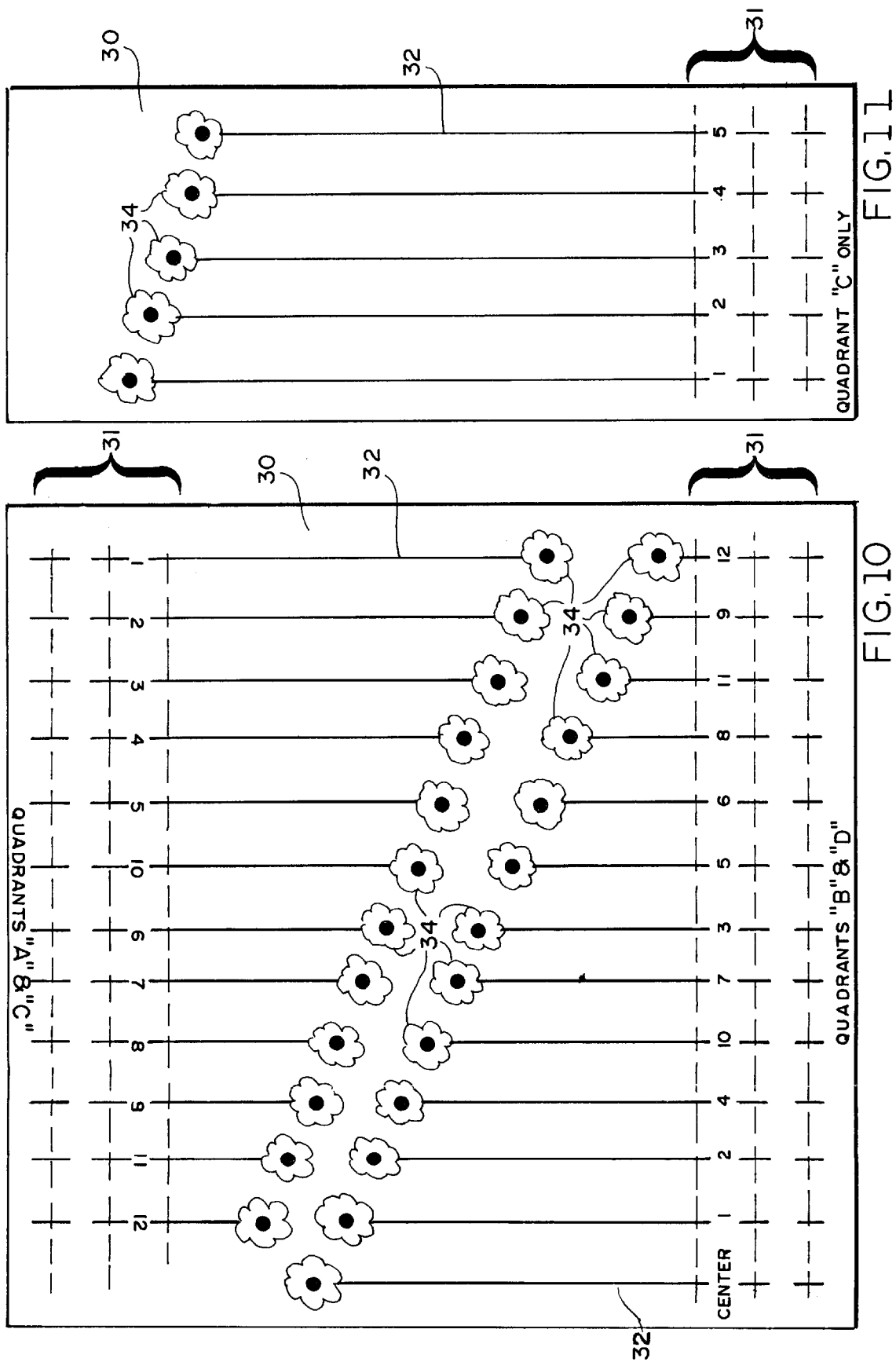

ARRANGER, CROWN, AND PATTERN FOR ARRANGEMENTS OF DECORATIVE ITEMS

FIELD OF THE INVENTION

The present invention is directed to the subject matter of bouquet arrangements for flowers and other items that are to be arranged in a grouping for decorative display.

SUMMARY OF THE PRIOR ART

The prior art abounds with various disclosures of techniques and structures for organizing a bouquet. Exemplary is U.S. Pat. No. 4,606,950 to Corbet for a method for assembling a floral arrangement. In accordance with its teaching, one may choose from a number of bases, each having a pattern of coded holes matching with a group of flowers, each with a corresponding code. The same fails to provide a teaching for the sizing of the flowers which are employed, and how to relate them to the number of bases. Moreover, it fails to simplify with a single base which is adaptable to a wide variety of floral arrangements. U.S. Pat No. 4,937,109 to Lin discloses an artificial floral arrangement utilizing a plurality of flower stems which are each marked, and then can be sized, and coordinated with a crown. U.S. Pat. Nos. 3,768,202; 1,775,250; 3,745,702; Design U.S. Pat. No. 145,868; U.S. Pat. No. 1,947,702; and Better Homes and Gardens for Floral and Nature Crafts, July 1995 and September 1995 similarly disclose various techniques for organizing a bouquet.

What the prior art fails to disclose, however, is a simple system utilizing a single structural member for organizing bouquets of a wide variety of sizes and flower types as well as positions against a wall, in a corner, or as a center piece. Moreover, the prior art fails to teach a method for sizing the elements to be inserted in the bouquet to the end that an arrangement can be achieved with a wide variety of flowers, emblems, signs, or decor and types of fillers.

SUMMARY OF THE INVENTION

The present invention derives from the development of a crown which is essentially a single piece unit formed desirably of plastic having a domed center portion with a plurality of guides and depending sides, each of which sides has coordinated guides. The sides, in turn, are hingedly secured to the domed central portion to permit a dependent relationship. Because each side has a securement means for penetrating a foam block, they can be wrapped around such a foam block in anticipation of the insertion of the decorative elements. Further in coordination with the crown, patterns are provided in which a sizing discipline is shown in random order of length, and with exemplary head sizes, to the end that flowers, whether artificial or natural and items such as flags, balloons, hearts, signs, and other emblems can be sized and prepared and counted and then directly inserted into the crown in accordance with the keyed indicia on the sizing portion of the patterns. The method of the invention is directed to first determining a particular pattern which is desired, and thereafter sequencing the arrangement predicated upon a pre-selected pattern which, in turn, contains coded indicia. The coded indicia matches comparable coded indicia on the crown. As a result, once the ingredients of the bouquet are sized and segregated in accordance with the coded indicia on the pattern, they can thereafter be inserted into the guides in the crown with the assurance that an attractive physical display will result. A further modification of the invention looks to patterns which will employ only certain portions of the crown and/or skirts.

Summarizing the scope of the invention, it is intended to provide structure and patterns to position decorative elements held at angles which dictate a proper balance to the shape and form of the arrangement.

In view of the foregoing it is a principle object of the present invention to provide a guide by means of a crown for achieving floral and like arrangements in a symmetrical or other organized fashion for a wide variety of displays.

A further object of the present invention looks to the provision of patterns which coordinate with a crown in order to assure a pre-selection of the desirable lengths of the materials being inserted into the crown.

Yet another object of the present invention looks to the development of a crown which is inexpensive to manufacture, durable in usage, and susceptible of easy correlation with alpha-numeric coding to a sizing pre-selected pattern.

BRIEF DESCRIPTION OF THE DRAWINGS

Further objects and advantages of the present invention will become apparent as the following description of an illustrative embodiment takes place, in conjunction with the accompanying drawings, in which:

FIG. 1 is a view of a floral arrangement exemplary of the prior art exhibiting a random pattern of ingredients;

FIG. 2 is an exemplary view of an arrangement bouquet made in accordance with the present invention;

FIG. 3 is a diagrammatic perspective view of the crown showing the skirts and its exploded relationship from the block of foam to which it is to be attached;

FIG. 7 is a diagrammatic view showing a plurality of flowers laid out on a pattern and a pair of scissors diagrammatically showing how the stems are cut to the appropriate length directed by the pattern;

FIG. 8 is a perspective view of a crown showing in illustrative fashion how the stems are inserted;

FIG. 9 is a pattern for a round bouquet which is essentially symmetrical;

FIG. 10 shows a pattern for an oval flower arrangement;

FIG. 11 shows a simple pattern variation of the oval arrangement of FIG. 10 to create a 3-sided or "against the wall" arrangement.

DESCRIPTION OF A PREFERRED EMBODIMENT

Figure 4:
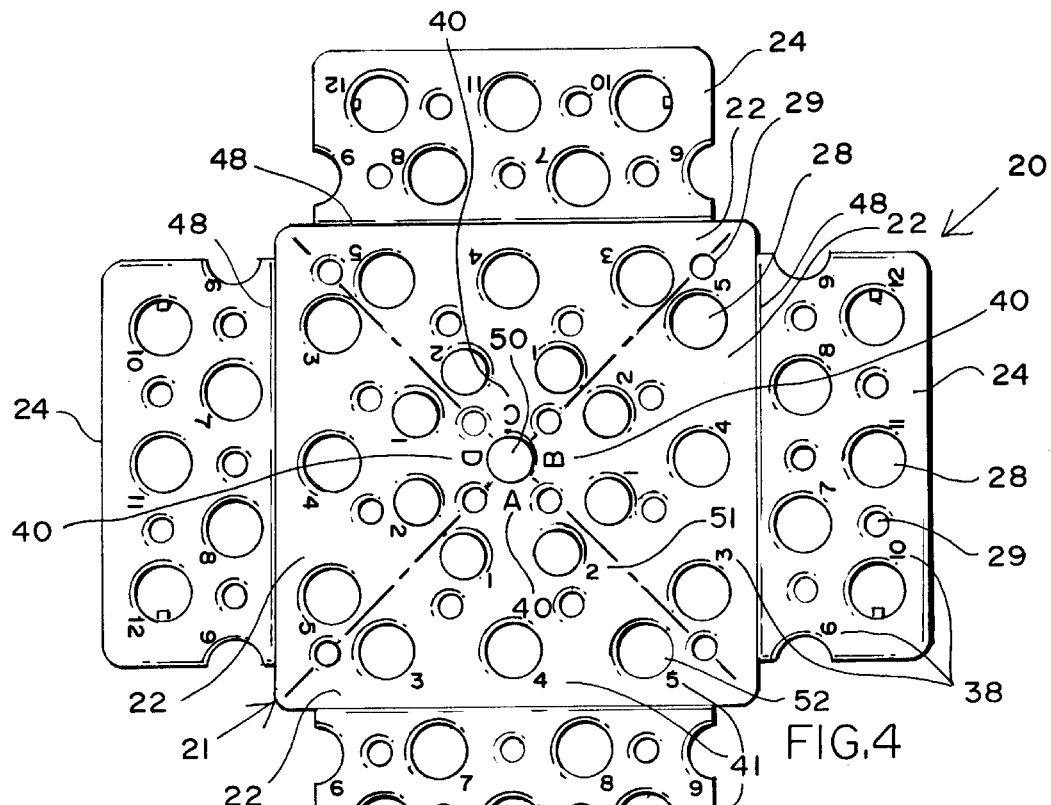
FIG. 4 is a top view of the crown showing its four quadrants.
Figure 5:
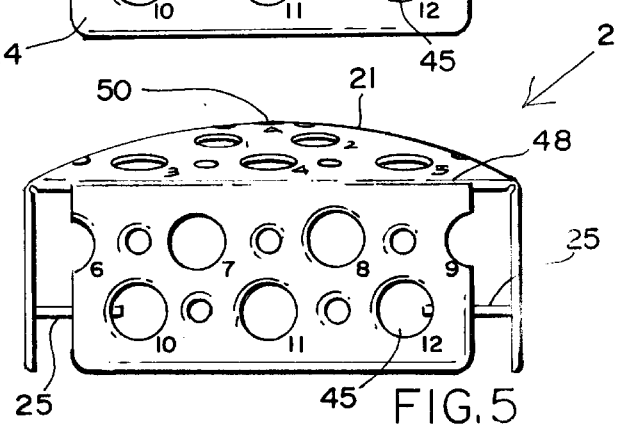
FIG. 5 is a side view of the crown showing one of the four skirts which is formed substantially the same as the other three.
Figure 6:
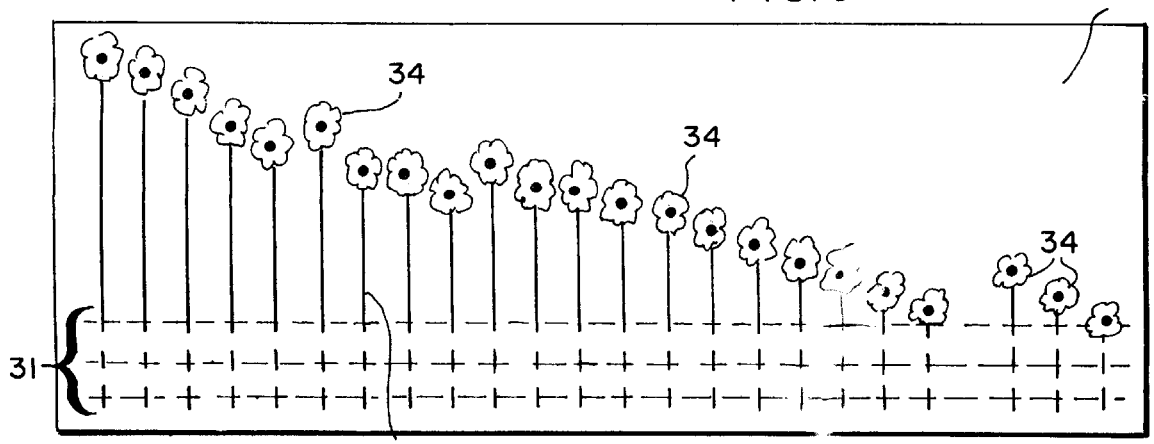
FIG. 6 shows a pattern for sizing the flowers.

The preferred embodiment of the present invention can be best understood in connection with its function. With reference to FIG. 1, it will be seen that the random insertion of the various floral elements in a vase, bowl, or other arranger, does not normally provide a symmetrical arrangement. FIG. 2, on the other hand, illustrates an attractive arrangement addressed to a center piece in which a dispersion of the floral elements is achieved in a uniform yet random pattern to the end that the bouquet is full, does not display voids, and maximizes the usage of the available floral pieces. The symmetry in FIG. 2 is achieved through the use of a professional type guide for sizing as well as a professional type support for the elements of the bouquet.

Turning now to FIG. 3, it will be seen that a crown 20 forms the heart of the present invention. The crown 20 has a dome 21 which is divided into four dome quadrants 22 labelled "A", "B", "C" and "D". While it is contemplated that the crown could be pentagonal, hexagonal, or even octagonal, the square configuration illustrated by the crown 20 is an exemplary configuration. Furthermore, the sections by which the dome is divided need not be quadrants, but rather may be adjusted to accommodate the shape of the crown. The invention is not intended to be limited to the dome of the crown other than presenting a uniform surface susceptible of coding for the insertion of floral or other decorative elements. Note that the crown 20 has a plurality of skirts 24, each of which contains a prong 25 (see FIG. 3) or other means for securing the crown to a foam block 26.

Apertures 23 are formed in the dome 21 as well as the skirts 24, the larger apertures being main guides 28, and the smaller being the filler guides 29. A desirable foam block 26 is formed from a product known by the trade as floral foam such as "Oasis", which is readily available at any floral house or crafts supply house.

Another aspect of the invention is directed to the patterns 30 as shown in FIGS. 6, 7 and 9–12. The patterns 30 primarily refer to indicia 31, a stem 32, and a bloom 34. The same could reference a flat pennant, street sign, heart, or other symbols on a stem or stick. Of course, the stem 32 and bloom 34 are indicated in silhouette fashion on the pattern 30. Beneath the silhouette are lines that permit cuttings for small, medium and large arrangements. The small line appears cut near the top of the indicia, the large line cut at the bottom and the medium line cut between the short and large indicia. Below each silhouette is desirably a key for the alpha-numeric guide for insertion. Also below each silhouette are indicia indicating for which quadrants 22 the stems 32 are to be cut, which in effect is an indication of the quantity of stems for the particular silhouette. Once the elements are cut or sized, in accordance with the showing in FIG. 7, the floral pieces or other emblems can be inserted into the apertures 23 of the crown 20. This is done by utilizing the code key 38 on the crown 20 which includes the alpha code 40 for identifying each of the quadrants and the numeric code 41 for identifying each of the guides in a given quadrant. Reference numeral 38 is intended to refer to the collection of alpha codes and numeric codes in their entireties. No code is employed for the filler holes or guides 29 since they do not present the dominant portion of the shape or motif, but rather exist for random insertion of normally more neutral and shorter items such as heather, ferns, bows, ribbons, and the like.

The indicia 31 on the pattern 30 works in conjunction with the key code 38 on the crown 20 to instruct a user as to where to place the floral pieces or other emblems. For example, if the indicia below a stem 32 reads "A1", the user would place the floral piece with the desired stem length in quadrant "A" and in the aperture 23 associated with numeric code "1". Similarly, "C12" would refer to the aperture 23 associated with numeric code "12" in the quadrant 22 associated with alpha code "C".

The patterns 30 can be used as a guide for making small, medium and large bouquets by selecting a different stem length for cutting the stems. Generally, the larger or longer stems are in the apertures 23 closer to the center 50, while the shorter stems are in the apertures 23 further away from the center 50. In many arrangements the skirts may not be used, or alternatively one or more of the skirts may lay in the same plane as the dome 21, as is the case when a rectangular block is employed. The center 50 of the crown 20 can be used for a specialty item such as the flag shown in FIG. 2 or for a particular flower such as a lily, a large pom pom, and the like. The numeric codes "1"–"12" on each of the quadrants 22 and the adjacent skirt is to make sure that the person putting the arrangement together covers each of the sequential arranger guides in accordance with a predetermined pattern. In this fashion, voids in the ultimate arrangement are avoided. If, however, voids are desired, they can be uniformly developed by skipping, for example, "4", "10", "11" and "12", or skipping "3" and "5", or even skipping one and two apertures when a large central piece is in the center hole 50. Thus, the true purpose of the guides is to assist in generating a uniform display, reserving to the arranger the color selection and the decorative piece, whether flower, or other decorative piece.

The crown 20 has skirts 24 that depend outwardly from each of the crown quadrants 22. Note that each skirt 24 is identified by the alpha code 40 that is associated with the quadrant 22 from which the skirt 24 depends. Each of the skirts also has numbered apertures 23. The skirt hinge 48 permits the skirt to be positioned outwardly for a very large display, or be adjusted downwardly in order to accommodate variously shaped foam blocks 26 that are encapsulated thereunder.

The center 50 of the crown 20 has extending immediately therefrom the alpha codes 40 identifying the quadrant or other segment of the crown (whether triangular, square, hexagonal, etc.) as described above. Each of the quadrants 22 of the crown 20 have numeric codes 41 that correspond to the apertures 23 located therein. As shown in FIG. 4, numeric codes "1" and "2" in each of the quadrants 22 are associated with those apertures 23 located near the center 50 of the crown 20. Extending outwardly are the numeric codes "3", "4" and "5", each of which is also associated with an aperture 23. Between the apertures 23 associated with numeric codes "3", "4", and "5" and the apertures associated with numeric codes "1" and "2" (on each of the quadrants 22) are two centrally positioned filler apertures or guides 23. Similarly, the skirts 24 include numeric codes 41 "6"–"12" that also correspond to specific apertures 23. Note that the two lateral edges of the skirt 24 have the numeric codes 6 and 9 associated with semi-circles, rather than full circular apertures. Filler holes are distributed evenly throughout the apertures 23 on each of the skirts 24.

The method of the present invention is illustrated in FIGS. 6–12. There it will be seen that in accordance with the preferred embodiment of the method, the floral pieces or decor are sized in accordance with the pattern 30 as shown in FIGS. 6–12. Note that the pattern 30 also specifies the quadrants 22 for which floral pieces or other decorative pieces are to be cut at the particular size for use in a given display. In effect, by specifying the quadrants, the patterns give the number of pieces which must be cut for each numbered aperture. Thereafter, once all of the floral pieces are assembled and cut, as shown in FIG. 7, they are then positioned into the crown 20 in accordance with the indicia 31 on the pattern 30, as illustrated in FIG. 8. Finally, after all of the elements are positioned, fillers 35 as illustrated in FIG. 1 may be inserted in the filler guides 29 in the dome 21 and/or the skirts 24.

In greater detail by reference to FIG. 9 there is shown a template for a round arrangement. In a symmetrical arrangement, quadrants "A", "B", "C", and "C" and their respective skirts are identically filled. For a small arrangement, some of the apertures 23 may be left empty. The items used in this arrangement can be cut along the upper dotted line for a small arrangement, the middle line for a medium size arrangement, and the bottom line for a large arrangement. Cutting from left to right, the left-hand element becomes the center piece and goes in the hole at the center 50 of the crown 20. Thereafter, in this example the stems or sticks are cut from left to right to fit the apertures 23 with numeric codes "2", "4", "1", and "3" in that sequence. The next sequence is to fill the apertures 23 with numeric codes "5", "9", "10", and "6". Such an arrangement results in a round bouquet. Note further that one stem is cut for the center, while four stems are cut for the balance of pattern 30 so that symmetry is achieved. In the event there is a desire to utilize the side flaps, four cuttings (one for each quadrant) are made for each of the apertures 23 with numeric codes "7", "8", "12", and "11".

FIG. 10 illustrates a pattern 30 for an oval shaped bouquet. The top of the pattern 30 in FIG. 10 is for cutting stems for quadrants "A" and "C", while the bottom of the pattern is for quadrants "B" and "D". From left to right (in accordance with small, medium, and large), the center stem is cut first and then the cuttings are for apertures in quadrants "B" and "D" with numeric codes "1", "2", "4", "10", "7", "3", "5", "6", "8", "11", "9", and "12". In filling the quadrants "A" and "C", the cuttings from left to right are in sequence of filling apertures with numeric codes "1", "2", "3", "4", "5", "10", "6", "7", "8", "9", "11", and "12".

The patterns in FIGS. 10 and 11 can be combined to create a three-sided display, such as might be used against a wall. Use the pattern in FIG. 10 to cut stems for quadrants "A", "B" and "D" only. Then use the pattern in FIG. 11 to cut stems for quadrant "C". Note that the skirt in quadrant "C" is not utilized. Combining the two patterns and filling the crown in accordance therewith yields a three-sided arrangement, which arrangement can then be placed with quadrant "C" against the wall.

Figure 12:
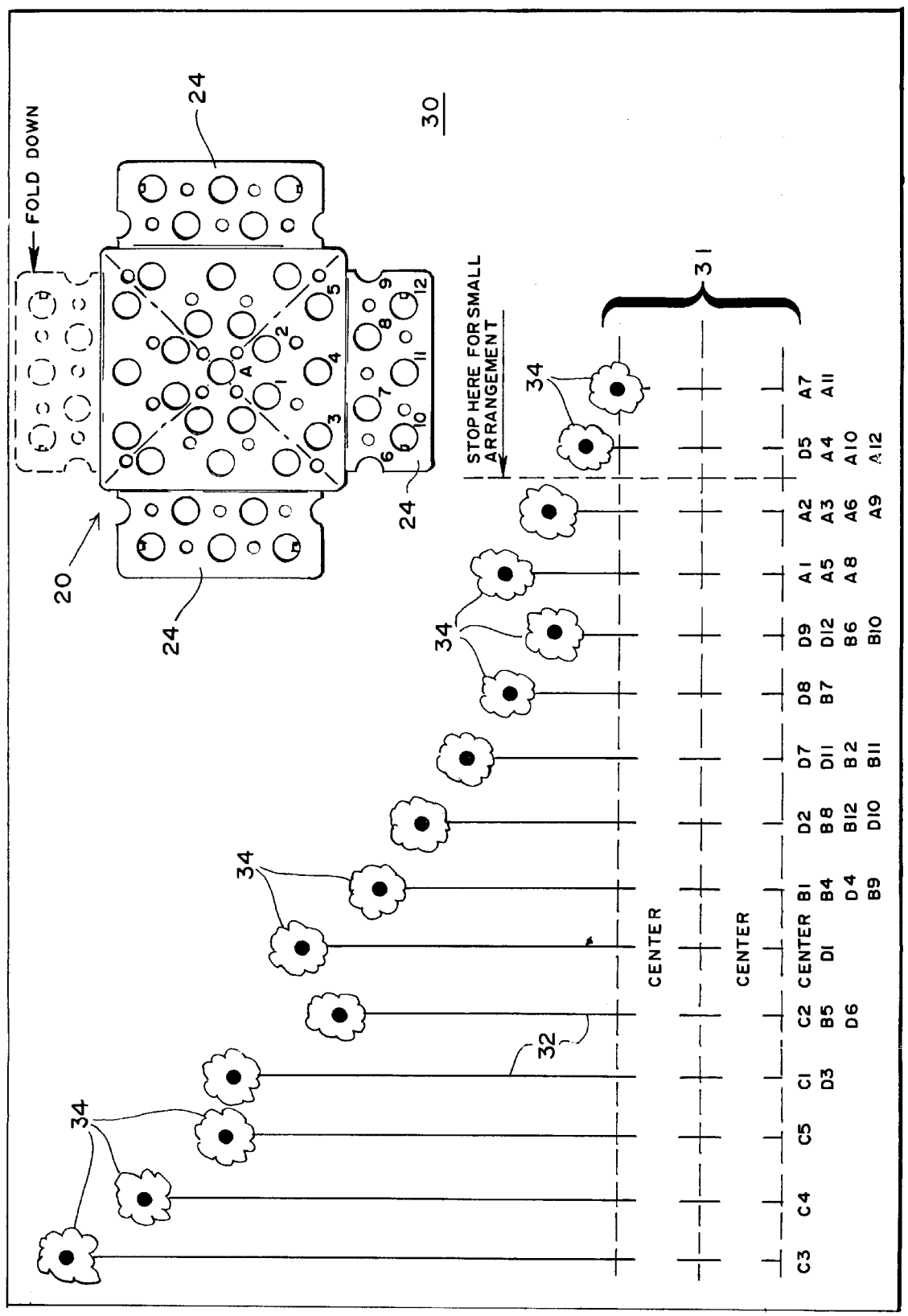
FIG. 12 is the pattern for the English garden arrangement.

Finally, for a rectangular arrangement, reference should be made to FIG. 12, the "English Garden." There it will be seen that proceeding from left to right on the pattern, the first stem to be cut is for aperture 23 associated with alphanumeric code "C3" (i.e., quadrant "C", guide No. 3). Continuing, stems are cut and then placed in apertures 23 for "C4"; "C5"; "C1" and "D3"; "C2", "B5" and "D6"; the center 50 and "D1"; "B1", "B4", "D4" and "B9"; "D2", "B8", "B12" and "D10"; "D7", "D11", "B2" and "B11"; "D8" and "B7"; "D9", "D12", "B6" and "B10"; "A1"; , "A5"; and "A8"; "A2", "A3", "A6" and "A9"; "D5", "A4", "A10" and "A12"; and "A7" and "A11". Also in this arrangement, the skirts 24 for quadrants "B" and "D" are intended to be flared outwardly on top of a rectangular block of foam with skirts "A" and "C" folded down. No flowers or other materials are inserted in skirt "C".

A wide variety of sequences and patterns can be developed for use with the crown 20. Additionally, the crown 20 can assume a shape different than the square shape of the crown 20 illustrated in the drawings. Moreover, the patterns can differ depending upon how many portions of the crown 20 are to be utilized in a given display and upon what shape of bouquet is desired. While the combinations may appear to be infinite, they are all derived from the single concept of a guide such as the crown 20 as illustrated, and as to the second aspect of the invention, sizing the flowers or other decorative materials in accordance with the patterns which are coordinated in an alpha-numeric (or other desirable code) for positioning in the crown.

It will be understood that various changes in the details, materials and arrangements of parts, which have been herein described and illustrated in order to explain the nature of the invention, may be made by those skilled in the art within the principle and scope of the invention as expressed in the appended claims.

What is claimed is:

1. A crown for use in a display of decorative elements, including flowers, in any combination, said crown comprising:

a central dome having lateral edges;

a plurality of skirts depending from the lateral edges of the central dome;

said central dome having an upper portion with a plurality of primary guides predeterminely positioned as apertures;

code indicia identifying each of said apertures; and, all of said apertures being positioned and oriented for the reception of the decorative elements, including flowers, in any combination, in a penetrable medium positioned beneath the crown.

2. In the crown of claim 1 above, said skirts being hingedly secured in a depending relationship from the lateral edges of the central dome, each of said skirts having secondary guides in the form of apertures for receiving decorative elements in concert with the primary guides in the central dome.

3. In the crown of claim 2, said skirts having a plurality of prongs to assist in anchoring the skirts to the penetrable medium positioned beneath the crown.

4. In the crown of claim 1, said central dome having a plurality of filler guides positioned in spaced order between the primary guides.

5. In the crown of any one of claims 1, 2, 3 or 4 above, said central dome being divided into a plurality of segments, with alpha coding identifying each segment;

each of said segments having numeric coding identifying each guide located in each of said segments, whereby the entire crown can be identified in alpha numeric fashion for arranging decorative elements.

6. In the crown of any one of claims 1, 2, 3, or 4 above, said central dome being essentially square in configuration.

7. In the crown of any one of claims 1, 2, 3, or 4 above, said central dome being divided into a plurality segments, with alpha coding identifying each segment, each of said segments having numeric coding identifying each guide located in each of said segments, said central dome having a center, said segments being selected to be evenly distributed about the center of the central dome.

8. A floral arrangement assembly system for arranging flowers and other decorative elements having stems, said system comprising:

a crown;

said crown having a central dome with lateral edges;

a plurality of skirts depending from the lateral edges of the central dome;

said central dome having an upper portion with a plurality of primary guides predeterminely positioned as apertures;

said crown having code indicia to identify each of the apertures therein;

a pattern;

said pattern having a plurality of silhouettes representative of the flowers and other decorative elements to be arranged; and, said pattern also having a first code corresponding to the code indicia or the crown for identifying the apertures in which the flowers and other decorative elements are to be inserted.

9. In the floral arrangement assembly system of claim 8 above, said pattern also having a plurality of lines intersecting said silhouettes, whereby the flowers and other decorative elements may be aligned with the silhouettes and then cut to a desired size for arranging.

10. In the floral arrangement assembly system according to claims 8 or 9 above.

said pattern also having a second code to identify a quantity of flowers and other decorative elements to be cut for an arrangement.

* * * * *